(12) United States Patent
Yoshinaga

(10) Patent No.: US 6,845,510 B2
(45) Date of Patent: Jan. 18, 2005

(54) OBJECTIVE LENS DRIVING DEVICE WITH COVER HAVING AN OPENING FOR EXPOSING A TRACKING COIL

(75) Inventor: Chikashi Yoshinaga, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 200 days.

(21) Appl. No.: 10/354,495

(22) Filed: Jan. 29, 2003

(65) Prior Publication Data

US 2003/0147336 A1 Aug. 7, 2003

(30) Foreign Application Priority Data

Feb. 1, 2002 (JP) .......................... 2002-025586

(51) Int. Cl.$^7$ .......................... G11B 7/08; G11B 7/085; G11B 7/09
(52) U.S. Cl. ...................................... 720/681
(58) Field of Search ............................. 720/681, 682, 720/683, 658, 672; 369/244.1

(56) References Cited

U.S. PATENT DOCUMENTS 4,987,565 A * 1/1991 Ikegame ................. 369/44.15
6,219,327 B1 * 4/2001 Kim et al. ................ 720/671
6,430,143 B1 * 8/2002 Kajiyama et al. .......... 720/671
2003/0007430 A1 * 1/2003 Ikeda et al. ............. 369/44.18

* cited by examiner

Primary Examiner—Julie Anne Watko
(74) Attorney, Agent, or Firm—Hogan & Hartson, LLP

(57) ABSTRACT

The height of a tracking coil in an objective lens driving device having a cover over a magnetic circuit is freed from limitations imposed by the cover, so that an effective length of the tracking coil can be ensured. Magnets 2, 3 generating an effective flux and facing yokes 6, 7 facing the magnets are provided such that effective edges of a focusing coil 12 and a tracking coil 13 are located in an air gap. A cover 19 is provided over the top surface of the magnets 2, 3 and the facing yokes 6, 7. The cover 19 has a notch formed for exposing the tracking coil 13 so as to avoid limiting the height of the tracking coil 13, thereby securing an appropriate effective length of the tracking coil 13 within the effective flux.

3 Claims, 3 Drawing Sheets

OBJECTIVE LENS DRIVING DEVICE WITH COVER HAVING AN OPENING FOR EXPOSING A TRACKING COIL

BACKGROUND OF THE INVENTION

1. Filed of the Invention

The present invention relates generally to an objective lens driving device installed on an optical head which reads/writes signals to and from a signal recording medium, such as an optical disk, and more specifically to an objective lens driving device having a cover over the top surface thereof.

2. Description of the Related Art

A typical objective lens driving device includes a lens holder to which an objective lens is mounted. The lens holder is connected to a frame by an elastic supporting member so that the lens holder is elastically supported by the frame.

Suspension wires are often used as the elastic supporting member. In an objective lens driving device using suspension wires, one end of each of multiple (typically four) suspension wires is fixed to the lens holder, while the other end of each suspension wire is fixed to a base plate attached to the frame to thereby support the lens holder on the frame movably and elastically.

The objective lens driving device usually has a cover over the top surface thereof to protect the elastic supporting members and a magnetic circuit during assembly or services.

The cover is made of a metal, typically steel, plate configured such that the top surface of a back yoke attached to a magnet can be magnetically attached to the top surface of a facing yoke arranged opposite the magnet. Thus, the cover reduces leakage of magnet flux and raises a magnetic flux density of an air gap formed between the magnet and the facing yoke where an effective edge of a driving coil is located.

A tracking coil is typically placed in the air gap facing one magnetic pole side of the magnet in the lens holder. When the magnetic circuit part of the objective lens driving device is covered by the cover, the height of the tracking coil may be limited by the cover, which may make it impossible to provide a tracking coil of effective length.

Further, if the cover is not securely affixed to the top surface of the back yoke and the facing yoke over the junction of two yokes, as is not uncommon, the increase of the magnetic flux density of the air gap may prove insufficient or contact of the cover against the top surface of the yokes between right and left parts of the cover may prove insufficient, leading to an unbalanced driving force of the lens holder.

In addition, when the lens holder is displaced beyond a normal range in a direction of an optical axis of the objective lens due to abnormal conditions, impact, etc. during installation of a focus servo, the lens holder may impinge on the cover and, if the lens holder is tilted to a great degree, the suspension wires, if used as the elastic supporting members, may be bent.

SUMMARY OF THE INVENTION

According to the present invention, a magnet generating an effective flux and a facing yoke facing the magnet are provided such that effective edges of a focusing coil and a tracking coil, both mounted on a lens holder, are located within an air gap. A cover is provided over the top surface of the magnet and the facing yoke. The cover has a notch formed for exposing the tracking coil so that the height of the tracking coil is not limited by the cover, thereby securing an appropriate effective length of the tracking coil within the effective flux.

Also according to the present invention, a cover is made of a magnetic metal steel plate, and includes a junction of two parts serving as a leaf spring, one part covering the top surface of a back yoke attached to the magnet and another part covering the top surface of the facing yoke. Thus, the cover can be securely adhered to the top surface of the back yoke and the facing yoke, even when the back yoke and the facing yoke differ in height or one yoke is slightly tilted from another yoke.

BRIEF DESCRIPTION OF THE DRAWING(S)

DESCRIPTION OF THE PREFERRED EMBODIMENT

Figure 1:
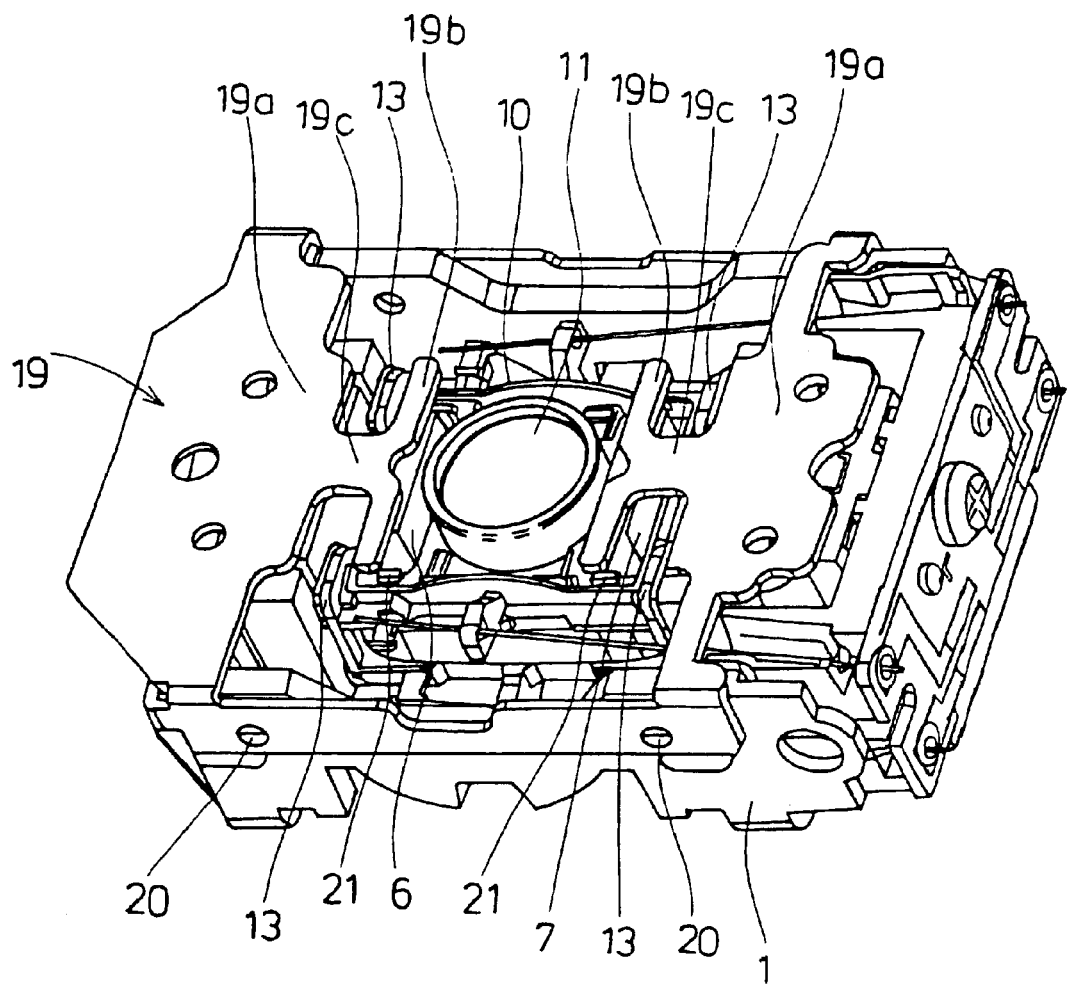
FIG. 1 is a perspective view showing an example objective lens driving device according to the present invention.
Figure 2:
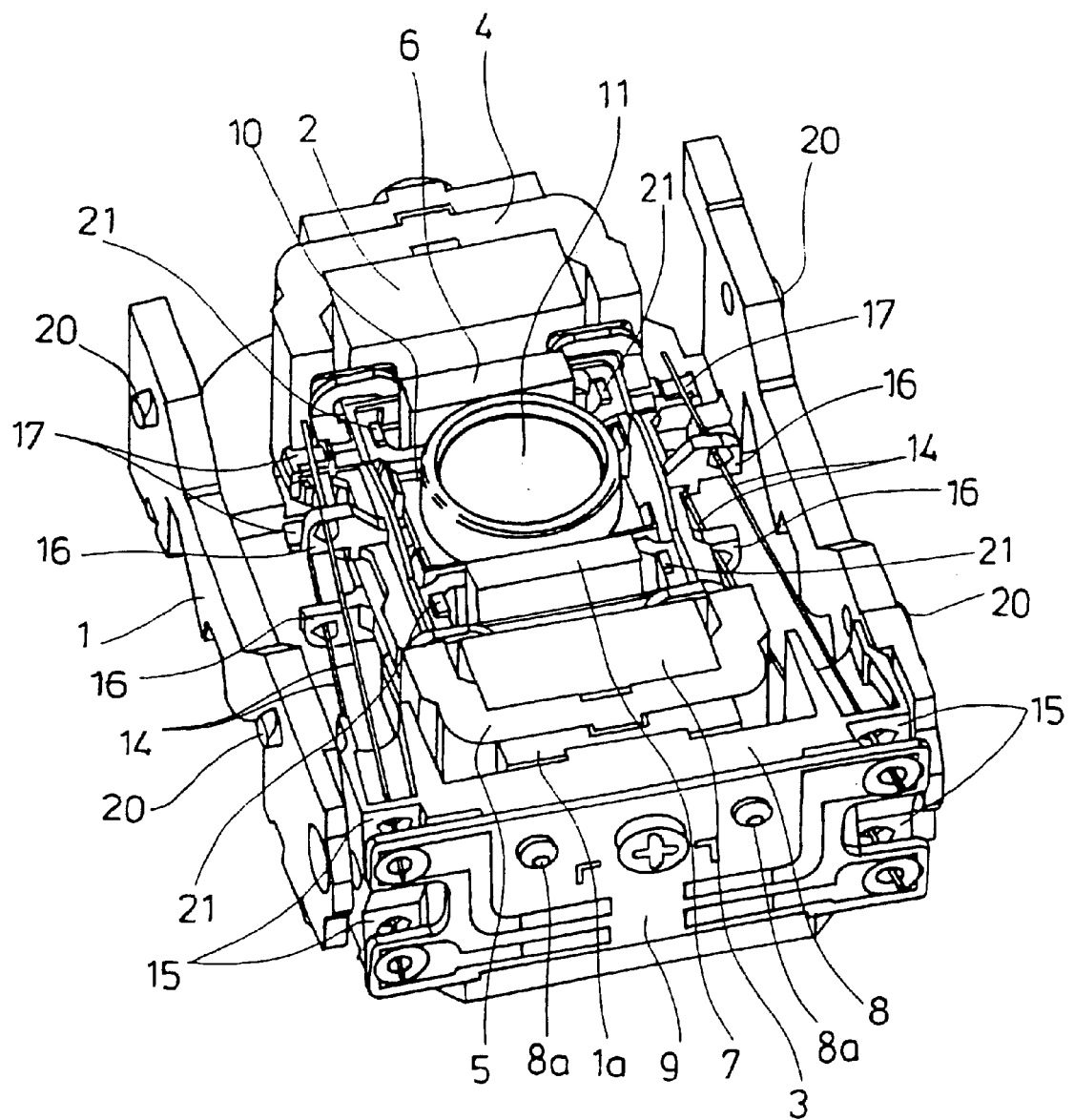
FIG. 2 is a perspective view of the objective lens driving device of FIG. 1 without a cover.
Figure 3:
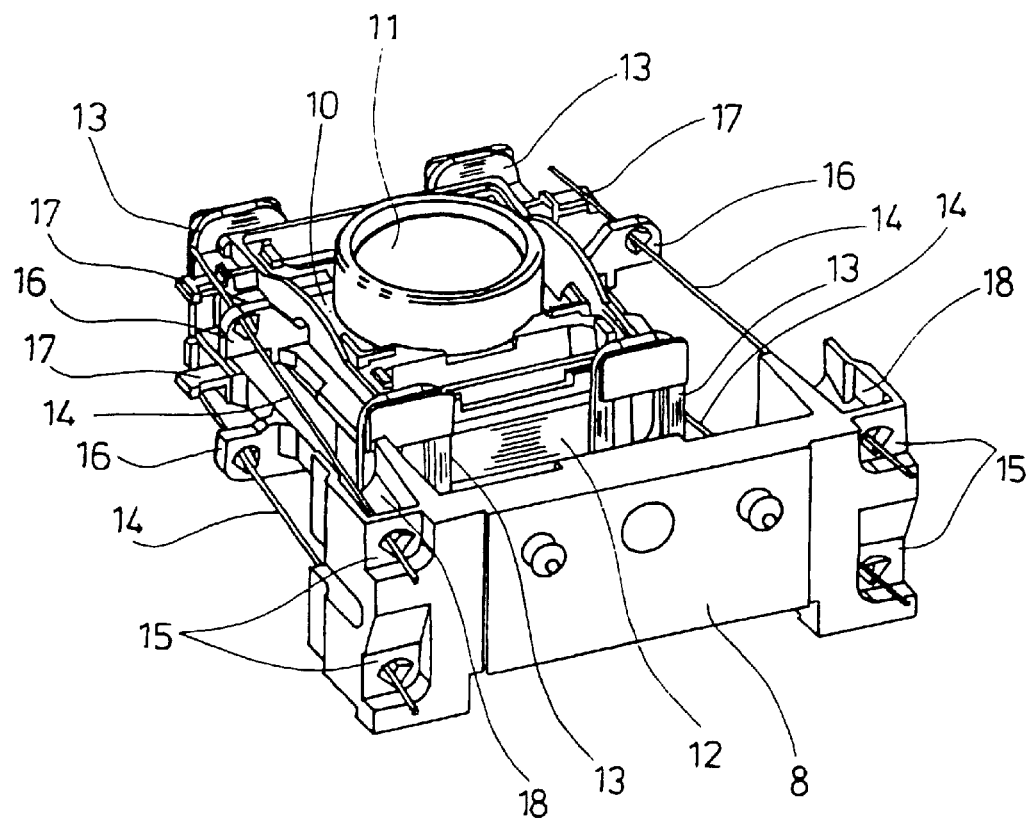
FIG. 3 is a perspective view of the objective lens driving device of FIG. 2 when a frame and a magnetic circuit are removed.

FIG. 1 is a perspective view showing an example objective lens driving device according to the present invention, FIG. 2 is a perspective view of the objective lens driving device of FIG. 1 without a cover, and FIG. 3 is a perspective view of the objective lens driving device of FIG. 1 when a frame and a magnetic circuit are removed.

A frame 1 is made by plating a metal plate of soft iron. On the frame 1, back yokes 4, 5 to which a pair of permanent magnets 2, 3 facing each other, and facing yokes 6, 7 facing the permanent magnets 2, 3, respectively, are fixedly attached.

The frame 1 includes an immovable part 1a formed integrally with the frame 1, to which a supporting member 8 is fixedly attached by a screw. When the supporting member 8 is fixed to the immovable part 1a, a wiring board 9 is positioned with respect to the supporting member 8 using positioning pins 8a formed on the supporting member 8, and is fixed together with the supporting member 8.

An objective lens 11 is mounted on a lens holder 10. The lens holder 10 is wound by a focusing coil 12 winding around the entire side face of the lens holder 10, and is also wound by four tracking coils 13 disposed at each corner of the lens holder 10.

Four suspension wires 14 supporting the lens holder 10 are inserted, through respective holes formed in the wiring board 9, through additional holes formed in a supporting part 15 of the supporting member 8, then to the holes formed in a supporting part 16 projecting from upper and lower center parts of a predetermined two opposing sides of the lens holder 10. One end of each of the suspension wires 14 is adhered to the supporting part 16 of the lens holder 10 using an adhesive of ultraviolet light hardening type, while the other end of each suspension wire 14 is similarly adhered to the supporting part 15 of the supporting member 8.

Thus, the lens holder 10 can be supported movably and elastically by the four suspension wires 14, enabling the lens holder 10 to move in one or both of a focusing direction and a tracking direction. Two pairs of suspension wires 14, each pair consisting of upper and lower two wires, extend along both sides of the lens holder 10. The upper and lower wires extend in parallel with each other, while each pair of wires diverge to the right or left of the lens holder 10.

The suspension wires 14 are disposed in a space 18 formed in the supporting member 8 corresponding to each suspension wire 14 (the space for lower suspension wires are not shown in the figure). Each space 18 is filled with a damping agent for controlling the vibration of each wire.

At one end side of each suspension wire 14, a projection 17 is formed integrally with the lens holder 10, to which a predetermined terminal of the focusing coil 12 and the tracking coils 13, respectively, is connected. One end of each of the suspension wires 14 is attached to the projection 17 by soldering, while the other end of each suspension wire 14 is soldered to a land of the wiring board 9. Thus, focusing and tracking control signals from the wiring board 9 are supplied to each driving coil via the suspension wires 14.

With the four suspension wires 14 thus provided and the lens holder 10 being supported in the frame 1, the permanent magnets 2, 3 are attached to corresponding back yokes 4, 5, respectively. The permanent magnets 2, 3 are arranged such that one magnetic pole side of each magnet, for example, a north pole side, faces a predetermined side of the lens holder 10 where effective edges of the driving coils are located.

The permanent magnets 2, 3 and the facing yokes 6, 7 form a respective air gaps wherein the effective edges of the driving coils are located.

Thus, when a focus control signal is supplied to the focusing coil 12, the objective lens 11 is moved in a focusing direction via the lens holder 10 in response to the focus control signal, while the objective lens 11 can be moved in a tracking direction via the lens holder in response to a tracking control signal supplied to each tracking coil 13.

Over the top surface of the objective lens driving device formed as described above, a cover 19 made by a ferrite-based cold rolled magnetic stainless steel plate is provided.

The cover 19 which characterizes the objective lens driving device according to the present invention will now be described in detail by mainly referring to FIG. 1.

The cover 19 is attached to the frame in a manner that engagement holes formed in the cover 19 engage with a plurality of nails 20 formed on the side wall of the frame 1, thereby covering the magnetic circuit part consisting of the permanent magnets 2, 3, the back yokes 4, 5, and the facing yokes 6, 7.

The cover 19 serves to connect the top surface of the back yoke 4 with the top surface of the facing yoke 6, and the top surface of the back yoke 5 with the top surface of the facing yoke 7, to thereby reduce leakage of magnetic flux. At the same time, the cover 19 serves to raise the magnetic flux density of each of the air gaps formed by the permanent magnets 2, 3 and the facing yokes 6, 7, respectively, where the effective edges of the driving coils are located.

The cover 19 includes notches for exposing the tracking coils 13. Thus, the length of the tracking coil 13 is not limited along its height, thereby securing an appropriate effective length of the tracking coil 13 within the effective flux.

The cover 19 includes a first part 19a covering the top surface of the permanent magnets 2, 3 and the back yokes 4, 5, and a second part 19b covering the top surface of the facing yokes 6, 7. The cover 19 also includes a junction 19c between the first part 19a and the second part 19b, which is made narrower than other parts and serves as a leaf spring.

Therefore, when the back yoke and the facing yoke have different heights, or when one yoke is slightly tilted from another yoke, it is still possible for the cover 19 be securely adhered to the top surface of the back yoke 4, 5 and the facing yoke 6, 7 by the spring force of the cover 19. The cover 19 can more securely be adhered especially to the facing yoke 6, 7 by the absorbing power produced by magnetic attraction, which helps to increase the magnetic flux density of each air gap. Such magnetic attraction also advantageously helps to maintain equality of the contact of the right and left parts of the cover with the top surface of the facing yokes 6, 7.

The second part 19b of the cover 19 covering the top surface of the facing yokes 6, 7 is expanded laterally toward the right and left of the facing yokes 6, 7, so that each expanded area becomes wider than the facing yokes 6, 7. Abutments 21 are formed projecting from the lens holder 10 at positions facing individual expanded areas to strike each expanded area to regulate a displacement of the lens holder 10.

When the lens holder 10 is excessively displaced beyond a normal range in a direction of the optical axis of the objective lens 11 as a result of abnormal conditions, impact, etc. during installation of a focus servo, the abutments 21 of the lens holder 10 strike the right and left expanded areas of the second part 19b, which are wider than the facing yokes 6, 7, to regulate the displacement of the lens holder 10 along the optical axis of the objective lens 11.

The abutments 21 are arranged on the outer right and left sides of the facing yokes 6, 7 of the lens holder 10 to control a tilt of the lens holder 10 and to prevent contact of the suspension wires 14 against the cover 19.

As described above, the cover of the present invention includes notches for exposing the tracking coils so that the height of the tracking coils is not limited, thereby securing space necessary for the tracking coils to have an appropriate effective length within the effective flux.

Also, the cover of the present invention includes a junction of two parts, one covering the top surface of the back yoke attached to the magnet and the other covering the top surface of the facing yoke, which together form a leaf spring. When the back yoke and the facing yoke differ in height or when one yoke is slightly tilted with respect to another yoke, it is still possible for the cover to be securely adhered to the upper surface of the back yoke and the facing yoke.

Further, because abutments are provided on the outer right and left sides of both facing yokes of the lens holder, when the lens holder is displaced beyond a normal range in a direction of the optical axis of the objective lens, it is possible to control tilt of the lens holder and prevent damage to the suspension wires used as the supporting members, by preventing contact between the wires and the cover.

What is claimed is:

1. An objective lens driving device comprising a cover over a top surface thereof and movably supporting a lens holder having an objective lens mounted thereon with respect to a frame by an elastic supporting member, wherein the lens holder includes a focusing coil and a tracking coil attached thereto, the objective lens driving device includes a magnet generating an effective flux and a facing yoke provided such that effective edges of the focusing coil and the tracking coil are located in an air gap, and the cover is provided over a top surface of the magnet and a top surface of the facing yoke and includes an opening for exposing the tracking coil.

2. An objective lens driving device according to claim 1, wherein the cover is made of a magnetic steel plate, and has a junction of two parts serving as a leaf spring, one part covering the top surface of a back yoke attached to the magnet and another part covering the top surface of the facing yoke.

3. An objective lens driving device according to claim 1, wherein the cover includes an expanded area over the top surface of the facing yoke, expanding laterally toward the right and left of the facing yoke in such a manner that the expanded area becomes wider than the facing yoke, and an abutment is provided on the lens holder at a position facing each expanded area so that the displacement of the lens holder is regulated by the striking of the expanded area by the abutment.

\* \* \* \* \*